United States Patent
Xiong et al.

(10) Patent No.: US 8,149,292 B2
(45) Date of Patent: Apr. 3, 2012

(54) AUTOMATIC WHITE BALANCE USING NON-UNIFORM AVERAGING

(75) Inventors: Weihua Xiong, Cupertino, CA (US); Jingtao Kuang, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 949 days.

(21) Appl. No.: 12/137,467

(22) Filed: Jun. 11, 2008

(65) Prior Publication Data
US 2009/0309995 A1 Dec. 17, 2009

(51) Int. Cl.
*H04N 9/73* (2006.01)
(52) U.S. Cl. .................................... 348/223.1
(58) Field of Classification Search .......... None
See application file for complete search history.

(56) References Cited

U.S. PATENT DOCUMENTS

| | | | |
|---|---|---|---|
| 6,504,952 B1 * | 1/2003 | Takemura et al. | 382/167 |
| 6,724,423 B1 * | 4/2004 | Sudo | 348/188 |
| 7,728,883 B2 * | 6/2010 | Hsu | 348/223.1 |
| 2003/0146372 A1 * | 8/2003 | Hsish et al. | 250/214.1 |
| 2005/0219380 A1 * | 10/2005 | Wu | 348/223.1 |
| 2007/0133071 A1 | 6/2007 | Noyes et al. | |
| 2008/0143844 A1 * | 6/2008 | Innocent | 348/223.1 |

* cited by examiner

*Primary Examiner* — Luong T Nguyen
(74) *Attorney, Agent, or Firm* — Blakely Sokoloff Taylor & Zafman LLP (57) ABSTRACT

The specification disclosed embodiments of an apparatus comprising an automatic white balance (AWB) circuit coupled to a pixel array to transform red, green, and blue color data obtained from each pixel into x and y chromaticity values for each pixel, determine a distance between the Planckian locus and the x and y chromaticity values for each pixel, determine a weight for each pixel based on the distance between its x and y chromaticity values and the Planckian locus, determine red, green, and blue adjustments for each pixel using its weight, and apply a white balance adjustment to the red, green and blue values obtained from each pixel. Other embodiments are also disclosed and claimed.

20 Claims, 4 Drawing Sheets

AUTOMATIC WHITE BALANCE USING NON-UNIFORM AVERAGING

TECHNICAL FIELD

The present invention relates generally to image sensors and in particular, but not exclusively, to automatic white balancing of an image sensor using non-uniform averaging.

BACKGROUND

The color of a scene in an image appears different depending on what kind of light source (i.e., what kind of illuminant) was incident on the scene when the image was taken. This is because different illuminants such as incandescent light, fluorescent light, and daylight, have different power spectral distributions. White balance (WB) is the process of removing unrealistic color casts so that objects that appear white in a scene also appear white in an image of that scene. In CMOS image sensors, this problem is solved by adjusting the gains of the three primary color channels: red, green and blue. The capability to do white balancing automatically without user interference is known as automatic white balance (AWB).

The most widely used AWB process is based on the "gray-world" assumption, which states that the average of the color in a scene is gray or colorless. Another commonly used assumption is the "white-world" assumption, which states that the brightest point in a scene is white, meaning that the red, green and blue values at the brightest point in a scene are equal to each other.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus, system and method for automatic white balancing using non-uniform averaging are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1:
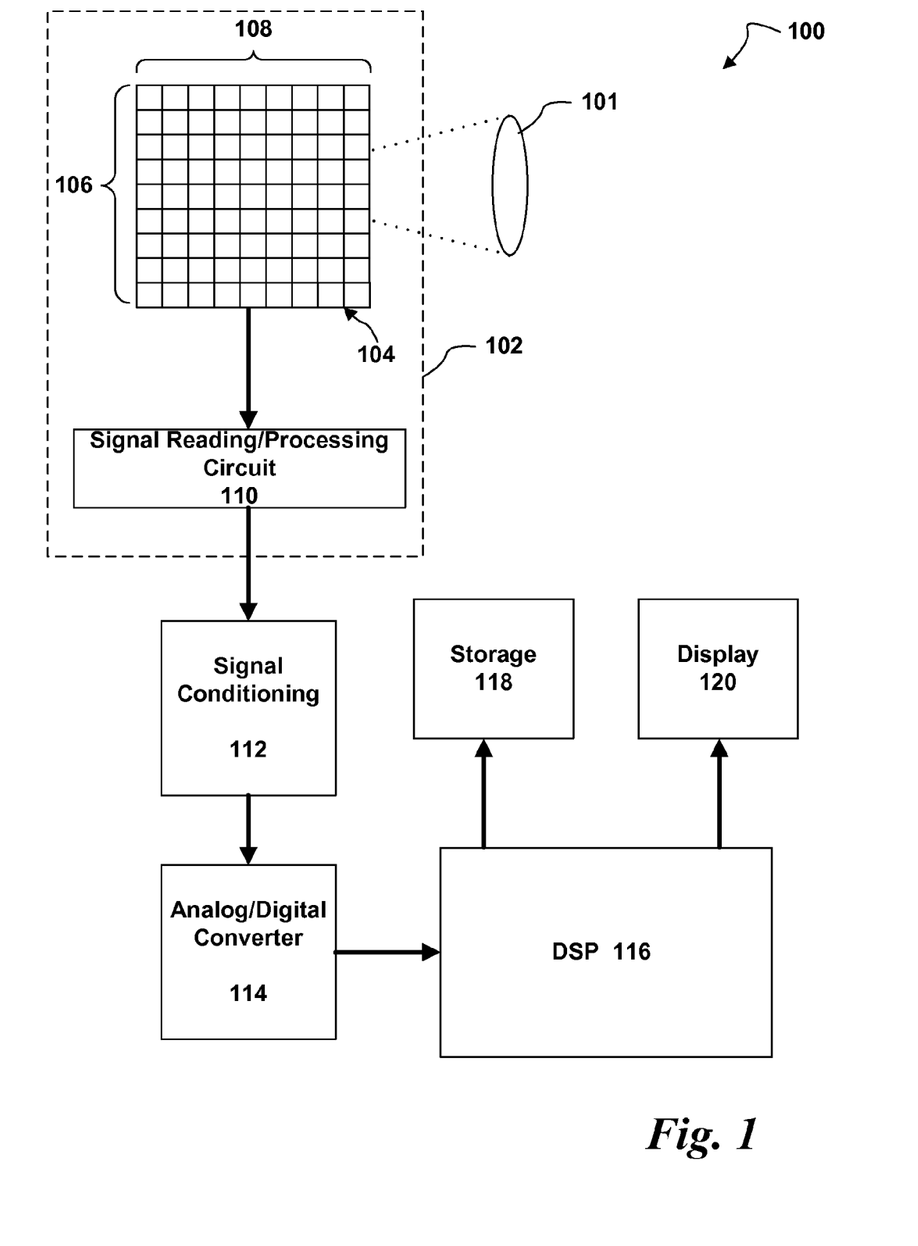
FIG. 1 is a schematic diagram of an embodiment of an imaging system including an image sensor.

FIG. 1 illustrates an embodiment of an imaging system 100. Optics 101, which can include refractive, diffractive or reflective optics or combinations of these, are coupled to image sensor 102 to focus an image onto the pixels in pixel array 104 of the image sensor. Pixel array 104 captures the image and the remainder of apparatus 100 processes the pixel data from the image.

Image sensor 102 comprises a pixel array 104 and a signal reading and processing circuit 110. Pixel array 104 is two-dimensional and includes a plurality of pixels arranged in rows 106 and columns 108. During operation of pixel array 104 to capture an image, each pixel in pixel array 104 captures incident light (i.e., photons) during a certain exposure period and converts the collected photons into an electrical charge. The electrical charge generated by each pixel can be read out as an analog signal, and a characteristic of the analog signal such as its charge, voltage or current will be representative of the intensity of light that was incident on the pixel during the exposure period.

Illustrated pixel array 104 is regularly shaped, but in other embodiments the array can have a regular or irregular arrangement different than shown and can include more or less pixels, rows, and columns than shown. Moreover, in different embodiments pixel array 104 can be a color image sensor including red, green, and blue pixels designed to capture images in the visible portion of the spectrum, or can be a black-and-white image sensor and/or an image sensor designed to capture images in the invisible portion of the spectrum, such as infra-red or ultraviolet.

Image sensor 102 includes signal reading and processing circuit 110. Among other things, circuit 110 can include circuitry and logic to methodically read analog signals from each pixel and filter these signals, correct for defective pixels, and so forth. In some embodiments, circuit 110 can also perform some or all of the automatic white balance process described below. In an embodiment where circuit 110 performs only part of the automatic white balance process, the remainder of the process can be performed by one or more other components such as signal conditioner 112 or DSP 116. Although shown in the drawing as an element separate from pixel array 104, in some embodiments reading and processing circuit 110 can be integrated with pixel array 104 on the same substrate or can comprise circuitry and logic embedded within the pixel array. In other embodiments, however, reading and processing circuit 110 can be an element external to pixel array 104 as shown in the drawing. In still other embodiments, reading and processing circuit 110 can be an element not only external to pixel array 104, but also external to image sensor 102.

Signal conditioner 112 is coupled to image sensor 102 to receive and condition analog signals from pixel array 104 and signal reading and processing circuit 110. In different embodiments, signal conditioner 112 can include various components for conditioning analog signals. Examples of components that can be found in signal conditioner include filters, amplifiers, offset circuits, automatic gain control, etc. In some embodiments, signal conditioner 112 can also perform some or all of the automatic white balance process described below. In an embodiment where signal conditioner 112 performs only part of the automatic white balance process, the remainder of the process can be performed by one or more other components such as circuit 110 or DSP 116.

Analog-to-digital converter (ADC) 114 is coupled to signal conditioner 112 to receive conditioned analog signals corresponding to each pixel in pixel array 104 from signal conditioner 112 and convert these analog signals into digital values.

Digital signal processor (DSP) 116 is coupled to analog-to-digital converter 114 to receive digitized pixel data from ADC 114 and process the digital data to produce a final digital image. DSP 116 can include a processor and an internal memory in which it can store and retrieve data. In some embodiments, DSP 116 can perform some or all of the automatic white balance process described below. In an embodiment where DSP 116 performs only part of the automatic white balance process, the remainder of the process can be performed by one or more other components such as circuit 110 or signal conditioner 112. After the image is processed by DSP 116, it can be output to one or both of a storage unit 118 such as a flash memory or an optical or magnetic storage unit and a display unit such as an LCD screen.

Figure 2:
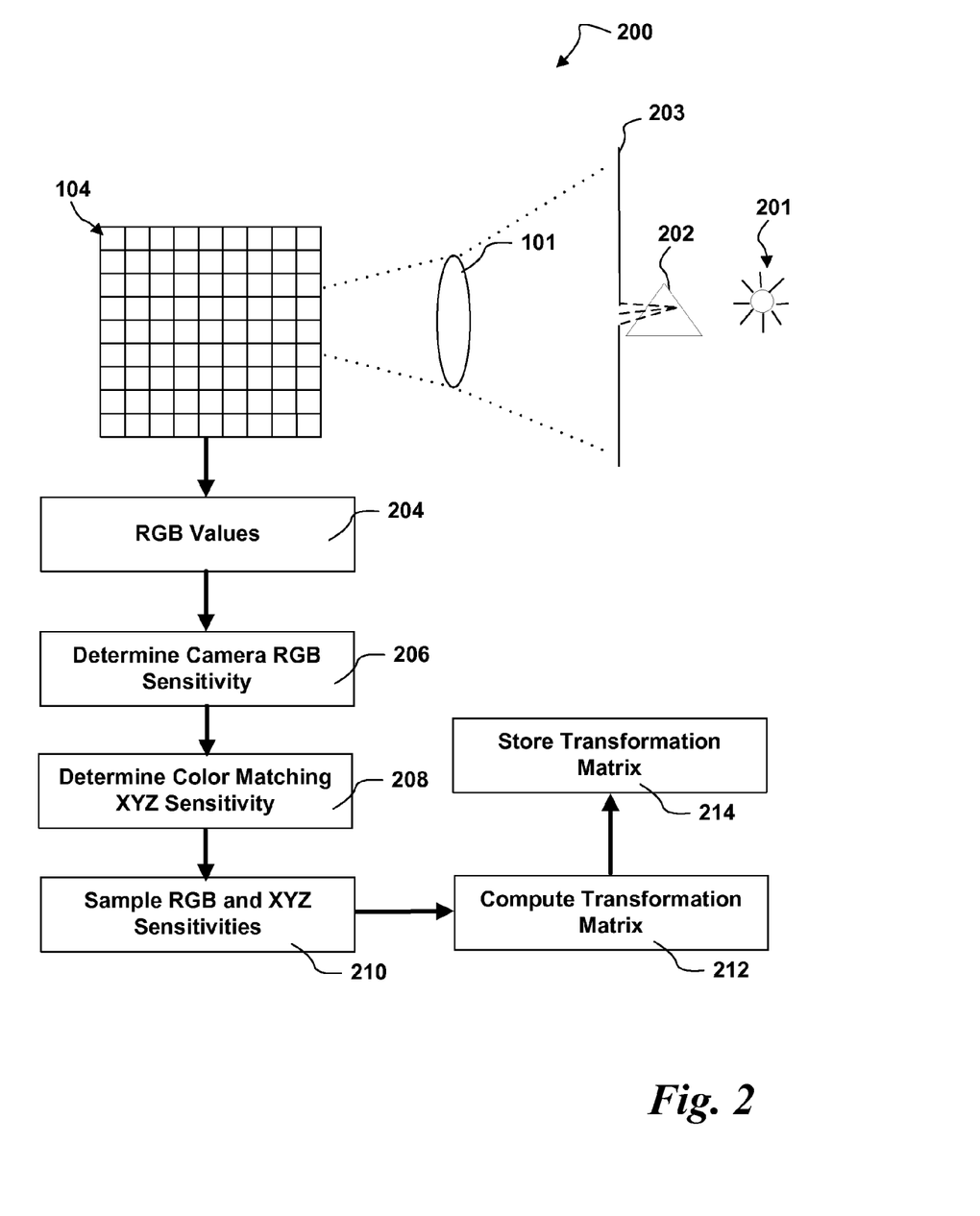
FIG. 2 is a diagram of an embodiment of a process for calibrating an image sensor to obtain a transformation matrix that transforms RGB color values from each pixel into color matching XYZ values for each pixel.

FIG. 2 illustrates an embodiment of a calibration process 200 for automatic white balance in an image sensor such as image sensor 102. When pixel array 104 captures a color image, each individual pixel typically captures only one color, depending on the type of color filter used with that pixel. In an embodiment in which pixel array 104 is a Red-Green-Blue (RGB) pixel array, some pixels can be "red pixels" that include a red filter and capture only red, some pixels can be "green pixels" that include a green filter and capture only green, and some pixels can be "blue pixels" that include a blue filter and capture only blue. These red, green, and blue pixels can be laid out in pixel array 104 in various patterns, such as the well-known Bayer pattern. In some embodiments pixel array 104 can also include "white pixels" that have no color filter.

Despite capturing only one color, each pixel in pixel array 104 will output a Red value R, a green value G, and a blue value B. This is because, for a particular pixel, values for colors not originally captured by that pixel are interpolated from neighboring pixels. For example, a pixel that is a red pixel will only capture a red value R from the scene, but will nonetheless have a green value G interpolated from neighboring green pixels and a blue value B interpolated from neighboring blue pixels. Thus, after the image capture and some initial processing, every pixel in pixel array 104 ends up with a set of red, green, and blue values. This set of RGB data can then be output from each pixel in pixel array 104 for further processing.

Calibration process 200 begins with pixel array 104, and hence image sensor 102, using imaging optics 101 to capture a physical measurement of a narrow-band spectrum, but in other embodiments other kinds of light sources, or a test chart, can be used. In an embodiment where the camera sensitivity function is obtained by taking a physical measurement of a narrow-band spectrum, white light from a light source 201 is passed through a prism 202. The colored light from prism 202 is then passed through a shutter 203 with a narrow slit while physically moving the shutter so that different spectral responses to different wavelengths of light can be measured (e.g. R, G, B). After determining the camera sensitivity function, image sensor 102, alone or together with other components coupled thereto, outputs $R_i$, $G_i$ and $B_i$ values at block 204 for each normal pixel i within pixel array 104.

Using the $R_i$, $G_i$ and $B_i$ values obtained at block 204 from the physical measurements, at block 206 a camera sensitivity function can be determined for image sensor 102. The camera sensitivity function relates the spectral response of each R, G and B color to the wavelength of the received light. Similarly, at block 208 a color matching function that relates the color matching values X, Y and Z to the wavelength of the received light can be determined based on the image sensor's response to the colors from prism 202. Using uniform finite sampling of wavelength response at n intervals, at block 210 the camera sensitivity function can be represented as a column vector $\overline{RGB}$ while the color matching function can be similarly be represented as a column vector $\overline{XYZ}$. When column vectors $\overline{RGB}$ and $\overline{XYZ}$ are determined, a transformation matrix M that converts RGB color values into XYZ color matching values can be found at block 212 by minimizing the value of $\|\overline{XYZ} - M * \overline{RGB}\|$. Transformation matrix M can then be determined using:

$$M = \overline{XYZ} * \overline{RGB}^+ \qquad \text{(Eq. 1)}$$

where $\overline{RGB}^+$ is the pseudo-inverse of matrix $\overline{RGB}$. Since the purpose of transformation matrix M is to transform a 3-element vector into another 3-element vector, M will be a 3 by 3 matrix. After transformation matrix M is determined, in one embodiment it can be stored at block 214 in an on-board memory located on image sensor 102 (e.g., in signal reading/processing circuit 110), but in other embodiments transformation matrix M can be stored in other components of an imaging system, such as signal conditioner 112 or digital signal processor 116. In most embodiments the calibration shown in FIG. 2 need only be done once, although in other embodiments it can, of course, be done more than once.

Figure 3:
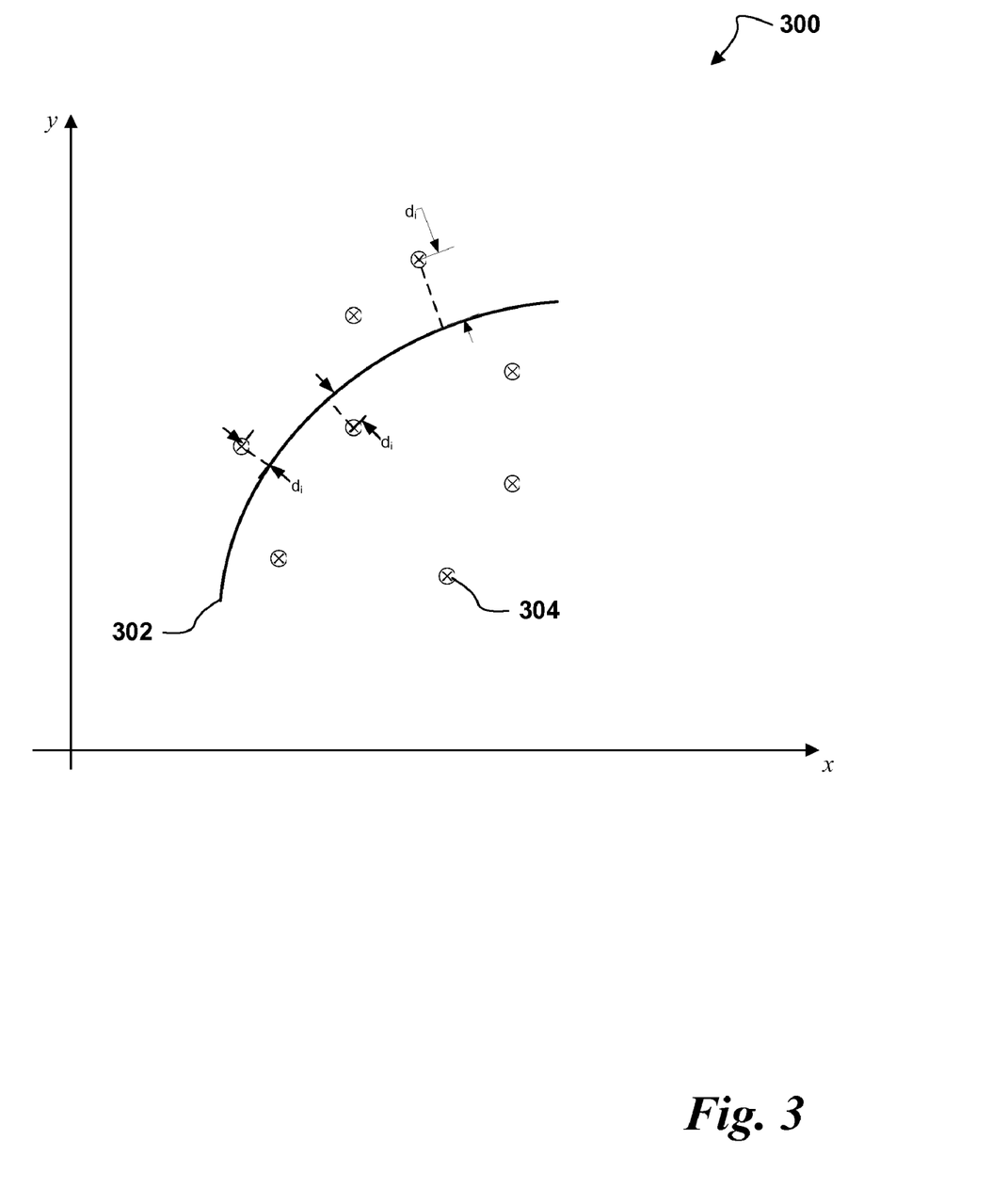
FIG. 3 is a graph illustrating pixel data and a Planckian locus in (x, y) chromaticity space.

FIG. 3 graphically illustrates an embodiment of a process for automatic white balance in an (x, y) chromaticity space. In FIG. 3, each cross-in-a-circle symbol (⊗) represents the (x, y) chromaticity coordinates of a particular pixel from pixel array 104. During operation of image sensor 102, each pixel in pixel array 104 outputs a red value $R_i$, a green value $G_i$ and a blue value $B_i$. Having obtained transformation matrix M during calibration as described above in connection with FIG. 2, the $R_i$, $G_i$ and $B_i$ values for each pixel i are first transformed into $X_i$, $Y_i$ and $Z_i$ color matching values for the same pixel by applying transformation matrix M:

$$\begin{bmatrix} X_i \\ Y_i \\ Z_i \end{bmatrix} = M \begin{bmatrix} R_i \\ G_i \\ B_i \end{bmatrix} \qquad \text{(Eq. 2)}$$

Once values of $X_i$, $Y_i$ and $Z_i$ are obtained for each pixel i, chromaticity values $x_i$ and $y_i$ are computed for each pixel according to the formulae:

$$x_i = \frac{X_i}{X_i + Y_i + Z_i}, \quad \text{and} \qquad \text{(Eq. 3)}$$

$$y_i = \frac{Y_i}{X_i + Y_i + Z_i}. \qquad \text{(Eq. 4)}$$

The values of $x_i$ and $y_i$ for each pixel represent its coordinates in chromaticity space, as shown in FIG. 3 in which each symbols ⊗ represents the chromaticity coordinates of a pixel.

After the ($x_i$, $y_i$) chromaticity coordinate of each pixel i is established, a distance $d_i$ in chromaticity space between the pixel's ($x_i$, $y_i$) chromaticity coordinates and the Planckian locus 302 is established. In one embodiment, distance $d_i$ for each pixel can be established by minimizing the length of the projection from the pixel's (x, y) chromaticity coordinates to Planckian locus 302, but in other embodiments distance $d_i$ for each pixel can be determined by other means. With distance $d_i$ determined for each pixel, a weight $w_i$ can then be computed for each pixel. Each weight $w_i$ is a function of the distance $d_i$ for that pixel. In one embodiment, weight $w_i$ is a monotonically decreasing function of the distance $d_i$. For example, weight $w_i$ can be computed using an inverse function:

$$w_i = \frac{C}{d_i}, \quad \text{(Eq. 5)}$$

where C can be an empirically or theoretically obtained constant, such as 32. In other embodiments, wi can be computed with more sophisticated functions, including Gaussian kernel functions as described below.

When the weight $w_i$ has been determined for each pixel as described above, the weights are used to computed white-equivalent red, green and blue values $R_e$, $G_e$ and $B_e$ for the image captured by pixel array 104 as follows:

$$w_{tot} = \sum_\Omega w_i, \quad \text{(Eq. 6)}$$

$$R_e = \frac{1}{w_{tot}} \sum_\Omega w_i R_i, \quad \text{(Eq. 7)}$$

$$G_e = \frac{1}{w_{tot}} \sum_\Omega w_i G_i, \text{ and} \quad \text{(Eq. 8)}$$

$$B_e = \frac{1}{w_{tot}} \sum_\Omega w_i B_i. \quad \text{(Eq. 9)}$$

In equations 6-9, the summation index $\Omega$ indicates that each sum is carried out over the entire image—that is, the summation includes every regular pixel in the pixel array. Regular pixels do not include special-purpose pixels such as black pixels used for black level calibration.

Figure 4:
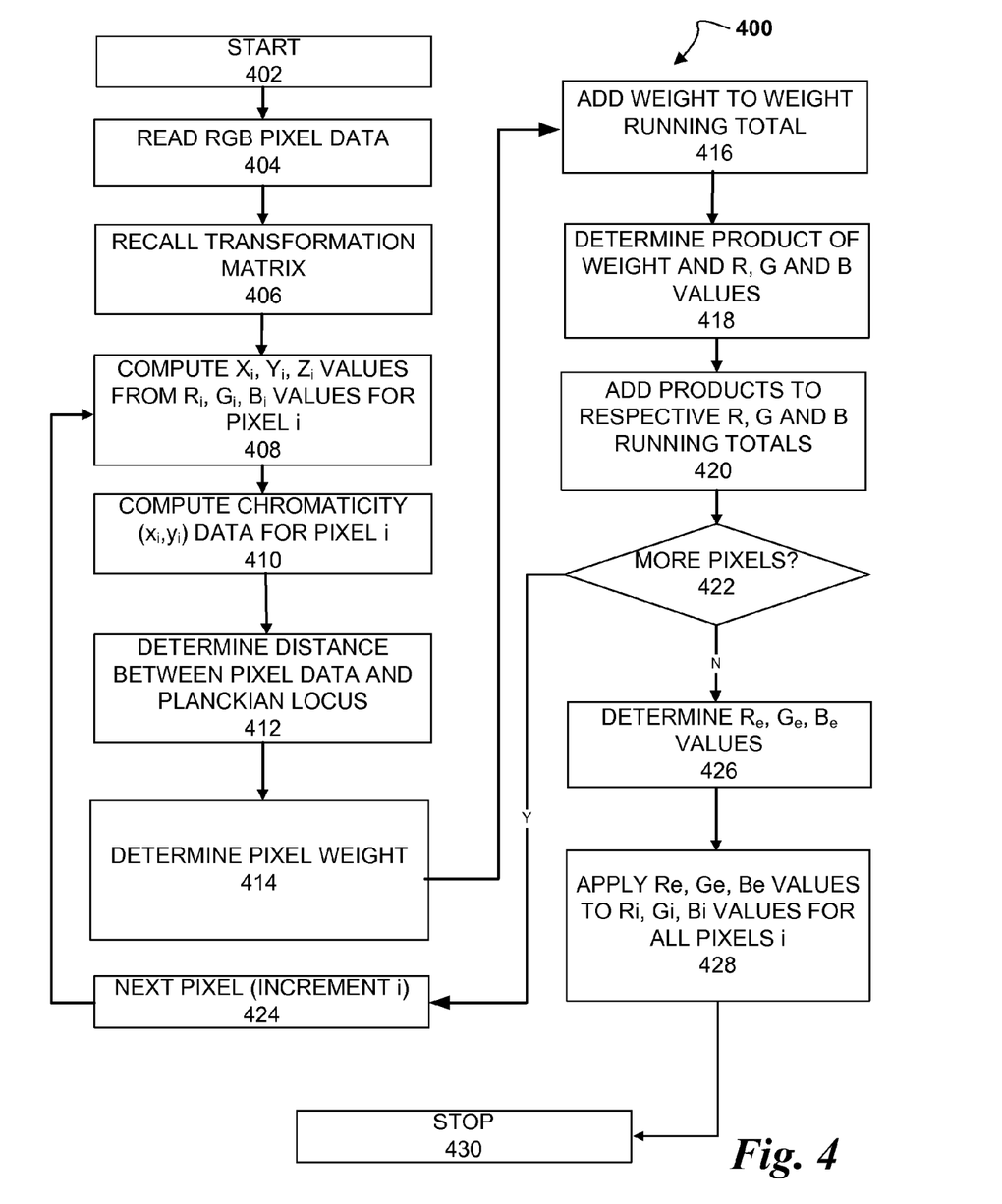
FIG. 4 is a flowchart illustrating an embodiment of a process for automatic white balance adjustment.

FIG. 4 illustrates, in flowchart form, an embodiment of an automatic white balance process 400 using chromaticity space using equations 1-9. The process starts at block 402. At block 404, RGB data for all pixels is read from pixel array 104 in an image sensor 102. At block 406, process 400 recalls transformation matrix M from wherever it is stored and at block 408 the process uses the transformation matrix M to transform the $R_i$, $G_i$ and $B_i$ values for the first pixel i into $X_i$, $Y_i$ and $Z_i$ color matching values as shown in equation 2.

At block 410, the process uses the $X_i$, $Y_i$ and $Z_i$ color matching values together with equations 3 and 4 to determine the $(x_i,y_i)$ chromaticity coordinates for the pixel. Using the $(x_i,y_i)$ chromaticity coordinates for the pixel, at block 412 the process determines the distance $d_i$ in chromaticity space between the $(x_i,y_i)$ chromaticity coordinates of the pixel and the Planckian locus. With distance $d_i$ determined, at block 414 the process computes the pixel weight $w_i$ for that pixel according to a monotonically decreasing function, such as the one shown in equation 5.

Having determined the pixel weight $w_i$ for a pixel at block 414, at block 416 the process adds that pixel's weight $w_i$ to a running total of the pixel weights for all pixels. In one embodiment, for example, the running weight total can be stored in a single memory register to which each new pixel weight $w_i$ is added when determined. Thus, after process 400 has determined a weight $w_i$ for every pixel in the array and all weights have been added to the running total, the running total (and the quantity stored in the register) will be the sum $$\sum_\Omega w_i$$

shown in equation 6.

At block 418, the process determines the product of the pixel's weight $w_i$ and the pixel's red, green and blue values. In other words, at block 418 the process computes the products $w_i R_i$, $w_i G_i$, and $w_i B_i$ shown in equations 7, 8 and 9. Similarly to the running weight total, at block 420 the products are added to respective running product totals. In one embodiment, for example, the three running product totals can be stored in three memory registers, one for each product. As each new product is determined, it is added to the running total in the respective memory register. Thus, after process 400 has determined the three products for every pixel in the array and all products have been added to the respective running total, the running totals (and the quantities stored in the memory registers) will be the sums $$\sum_\Omega w_i R_i, \sum_\Omega w_i G_i$$

and $$\sum_\Omega w_i B_i$$

shown in equations 7, 8 and 9.

At block 422 the process checks whether there are more pixels from the pixel array whose weight and products need to be determined. If there are more pixels whose weight and products need to be determined, the process selects the next pixel at block 424 (i.e., it increments the value of i by 1) and returns to block 408 and goes through blocks 408 to 420 again for the next pixel. If at block 422 there are no more pixels whose weight and products need to be determined (i.e., all pixels in the array have been processed), the process moves to block 426 where, using the weight totals and product totals, the process determined the quantities $R_e$, $G_e$ and $B_e$ shown in equations 6-9. At block 428 quantities $R_e$, $G_e$ and $B_e$ are used to white balance the original $R_i$, $G_i$, $B_i$ pixel data for every pixel i in pixel array 104, and at block 430 the process stops.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
an automatic white balance (AWB) circuit coupled to a pixel array to:

transform red, green, and blue color data obtained from each pixel into x and y chromaticity values for each pixel;

determine a minimum distance in (x, y) space between a Planckian locus and the x and y chromaticity values for each pixel;

determine a weight for each pixel based on the minimum distance between the x and y chromaticity values for each pixel and the Planckian locus;

determine red, green, and blue adjustments for each pixel using the weight for each pixel, and apply a white balance adjustment to the red, green and blue color data obtained from each pixel.

2. The apparatus of claim 1 wherein chromaticity values x and y are computed according to the following formulae:

$$x = \frac{X}{X+Y+Z} \text{ and } y = \frac{Y}{X+Y+Z}.$$

3. The apparatus of claim 1 wherein determining the weight for each pixel is a function of the distance between the x and y chromaticity values for each pixel and the Planckian locus.

4. The apparatus of claim 3 wherein the function is a function that is inversely proportional to distance from the Planckian locus.

5. A system comprising:
an optical element;
an image sensor coupled to the optical element, the image sensor comprising:
a pixel array including a plurality of pixels,
an automatic white balance (AWB) circuit coupled to the pixel array to:
transform red, green, and blue color data obtained from each pixel into x and y chromaticity values for each pixel;
determine a distance between a Planckian locus and the x and y chromaticity values for each pixel;
determine a weight for each pixel based on the distance between the x and y chromaticity values for each pixel and the Planckian locus;
determine red, green, and blue adjustments for each pixel using the weight for each pixel, wherein determining red, green and blue adjustments for each pixel comprises using the weight for each pixel and the red, green and blue color data from each pixel to determine a weighted average red value, a weighted average green value, and a weighted average blue value, and adjusting the red, green and blue color data of each pixel using the corresponding weighted average values, and
apply a white balance adjustment to the red, green and blue color data obtained from each pixel.

6. The system of claim 5 wherein chromaticity values x and y are computed according to the following formulae:

$$x = \frac{X}{X+Y+Z} \text{ and } y = \frac{Y}{X+Y+Z}.$$

7. The system of claim 5 wherein determining the weight for each pixel is a function of the distance between the x and y chromaticity values for each pixel and the Planckian locus.

8. The system of claim 7 wherein the function is a function that is inversely proportional to distance from the Planckian locus.

9. A process comprising:
transforming red, green, and blue color data obtained from each pixel in a pixel array into x and y chromaticity values for each pixel;
determining a minimum distance in (x, y) space between a Planckian locus and the x and y chromaticity values for each pixel;
determining a weight for each pixel based on the minimum distance between its x and y chromaticity values and the Planckian locus;
determining red, green, and blue adjustments for each pixel using the weight for each pixel, and
applying a white balance adjustment to the red, green and blue color data obtained from each pixel.

10. The process of claim 9 wherein chromaticity values x and y are computed according to the following formulae:

$$x = \frac{X}{X+Y+Z} \text{ and } y = \frac{Y}{X+Y+Z}.$$

11. The process of claim 9 wherein determining the weight for each pixel is a function of the distance between the x and y chromaticity values for each pixel and the Planckian locus.

12. The process of claim 11 wherein the function is a function that is inversely proportional to distance from the Planckian locus.

13. An apparatus comprising:
an automatic white balance (AWB) circuit coupled to a pixel array to:
transform red, green, and blue color data obtained from each pixel into x and y chromaticity values for each pixel;
determine a distance between a Planckian locus and the x and y chromaticity values for each pixel;
determine a weight for each pixel based on the distance between the x and y chromaticity values for each pixel and the Planckian locus;
determine red, green, and blue adjustments for each pixel using the weight for each pixel, wherein determining red, green and blue adjustments for each pixel comprises using the weight for each pixel and the red, green and blue color data from each pixel to determine a weighted average red value, a weighted average green value, and a weighted average blue value, and adjusting the red, green and blue color data of each pixel using the corresponding weighted average values; and
apply a white balance adjustment to the red, green and blue color data obtained from each pixel.

14. The apparatus of claim 13 wherein chromaticity values x and y are computed according to the following formulae:

$$x = \frac{X}{X+Y+Z} \text{ and } y = \frac{Y}{X+Y+Z}.$$

15. The apparatus of claim 13 wherein determining the weight for each pixel is a function of the distance between the x and y chromaticity values for each pixel and the Planckian locus.

16. The apparatus of claim 14 wherein the function is a function that is inversely proportional to distance from the Planckian locus.

17. A process comprising:
- transforming red, green, and blue color data obtained from each pixel in a pixel array into x and y chromaticity values for each pixel;
- determining a distance between a Planckian locus and the x and y chromaticity values for each pixel;
- determining a weight for each pixel based on the distance between its x and y chromaticity values and the Planckian locus;
- determining red, green, and blue adjustments for each pixel using the weight for each pixel, wherein determining red, green and blue adjustments for each pixel comprises using the weight for each pixel and the red, green and blue color data from each pixel to determine a weighted average red value, a weighted average green value, and a weighted average blue value, and adjusting the red, green and blue color data of each pixel using the corresponding weighted average values; and
- applying a white balance adjustment to the red, green and blue color data obtained from each pixel.

18. The process of claim 17 wherein chromaticity values x and y are computed according to the following formulae:

$$x = \frac{X}{X+Y+Z} \text{ and } y = \frac{Y}{X+Y+Z}.$$

19. The process of claim 17 wherein determining the weight for each pixel is a function of the distance between the x and y chromaticity values for each pixel and the Planckian locus.

20. The process of claim 19 wherein the function is a function that is inversely proportional to distance from the Planckian locus.

* * * * *

UNITED STATES PATENT AND TRADEMARK OFFICE
CERTIFICATE OF CORRECTION

| | | |
|---|---|---|
| PATENT NO. | : 8,149,292 B2 | Page 1 of 1 |
| APPLICATION NO. | : 12/137467 | |
| DATED | : April 3, 2012 | |
| INVENTOR(S) | : Xiong et al. | |

It is certified that error appears in the above-identified patent and that said Letters Patent is hereby corrected as shown below:

On the Title page:

In Item (75), Inventors, Line 2, delete "Jingtao" and replace with -- Jiangtao --.

Signed and Sealed this
Twenty-sixth Day of June, 2012

David J. Kappos
*Director of the United States Patent and Trademark Office*